(12) United States Patent
Sontheim et al.

(10) Patent No.: US 11,411,844 B2
(45) Date of Patent: Aug. 9, 2022

(54) METHOD OF TRACKING PROGRESS IN A DISTRIBUTED SYSTEM

(71) Applicant: Sontheim Industrie Elektronik GmbH, Kempten (DE)

(72) Inventors: Bruno Sontheim, Kempten (DE); Martin Lorenz, Kempten (DE); Silvije Jovalekic, Albstadt (DE); Michael Wiescholek, Sindelfingen (DE)

(*) Notice: Subject to any disclaimer, the term of this patent is extended or adjusted under 35 U.S.C. 154(b) by 0 days.

(21) Appl. No.: 15/298,631

(22) Filed: Oct. 20, 2016

(65) Prior Publication Data

US 2017/0155563 A1    Jun. 1, 2017

(30) Foreign Application Priority Data

Oct. 21, 2015   (DE) .................... 10 2015 117 949.0

(51) Int. Cl.
*H04L 43/045* (2022.01)
*G06F 11/32* (2006.01)
*G06F 11/30* (2006.01)
*G06F 11/34* (2006.01)
*H04L 43/00* (2022.01)

(52) U.S. Cl.
CPC ........ *H04L 43/045* (2013.01); *G06F 11/3006* (2013.01); *G06F 11/323* (2013.01); *G06F 11/3476* (2013.01); *G06F 11/3495* (2013.01); *H04L 43/14* (2013.01); *G06F 11/3409* (2013.01); *G06F 2201/835* (2013.01)

(58) Field of Classification Search
CPC ....... H04L 43/045; H04L 43/14; G06F 11/323
See application file for complete search history.

(56) References Cited

U.S. PATENT DOCUMENTS

| | | | |
|---|---|---|---|
| 6,687,750 B1* | 2/2004 | Messinger | H04L 41/22 703/6 |
| 8,782,526 B2* | 7/2014 | Tan | G06F 3/04815 715/736 |
| 2008/0269932 A1* | 10/2008 | Chardon | G06F 40/18 700/98 |
| 2009/0089226 A1* | 4/2009 | Bradford | G05B 19/4185 706/12 |
| 2010/0110932 A1* | 5/2010 | Doran | H04L 41/12 370/254 |
| 2012/0084779 A1* | 4/2012 | Adler | G06F 11/3006 718/100 |

(Continued)

OTHER PUBLICATIONS

Wismuller et al. "Enhanced monitoring in the GRADE programming environment by using OMIS", Future Generation Computer Systems vol. 16, Issue 6, Apr. 2000, pp. 637-648. (Year: 2000).*

(Continued)

*Primary Examiner* — Brian Whipple
*Assistant Examiner* — James Ross Hollister
(74) *Attorney, Agent, or Firm* — Collard & Roe, PC

(57) ABSTRACT

Program progress, the flow of information and/or the interaction of users in a distributed system of programmable controls and/or data-processing systems is/are tracked. Time stamps are generated and stored at previously defined places of the system. The time stamps contain a respective time and an ID and also may contain a respective clock time, a location, a type, a consecutive number and/or other data. The time stamps are generated on a software or hardware basis.

15 Claims, 4 Drawing Sheets

(56) References Cited

U.S. PATENT DOCUMENTS

Figure 1:
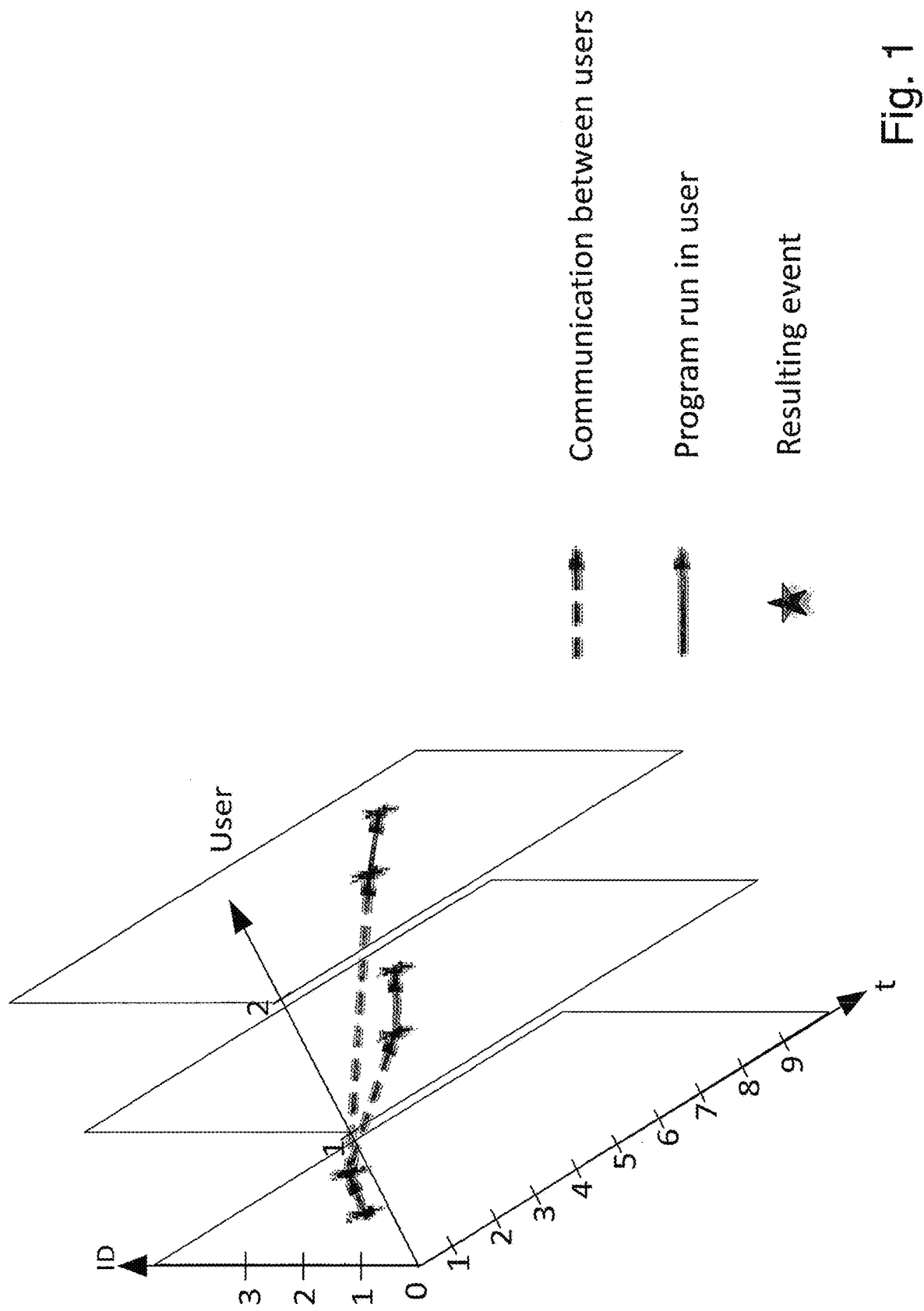

| | | | | |
|---|---|---|---|---|
| 2013/0116976 A1* | 5/2013 | Kanemasa | ......... | G06F 11/3419 702/186 |
| 2014/0204799 A1* | 7/2014 | Pietrowicz | ............. | H04L 41/22 370/254 |
| 2014/0280894 A1* | 9/2014 | Reynolds | ........... | H04L 43/0876 709/224 |
| 2014/0280912 A1* | 9/2014 | Gregg | .................... | H04L 41/22 709/224 |
| 2015/0039751 A1* | 2/2015 | Harrigan | .............. | H04L 43/045 709/224 |
| 2015/0117244 A1* | 4/2015 | Williamson | ......... | H04L 43/045 370/252 |
| 2015/0180739 A1* | 6/2015 | Horn | .................. | G06F 11/2028 709/224 |
| 2016/0224459 A1* | 8/2016 | Liu | ..................... | G06F 11/3644 |
| 2016/0357587 A1* | 12/2016 | Yadav | ................... | G06F 16/173 |
| 2017/0012847 A1* | 1/2017 | Liensberger | ....... | G06F 11/3447 |

OTHER PUBLICATIONS

Schnorr et al. "Triva: Interactive 3D visualization for performance analysis of parallel applications", Future Generation Computer Systems vol. 26, Issue 3, Mar. 2010, pp. 348-358. (Year: 2010).*

* cited by examiner

METHOD OF TRACKING PROGRESS IN A DISTRIBUTED SYSTEM

CROSS REFERENCE TO RELATED APPLICATIONS

Applicant claims priority under 35 U.S.C. § 119 of German Application No. 10 2015 117 949.0 filed on Oct. 21, 2015, the disclosure of which is incorporated by reference.

The invention relates to a method for detecting time behavior, tracking the program progress, the flow of information and/or the interaction of users in a distributed system of programmable control systems and/or data-processing systems.

In the past, these distributed systems were 'tracked' through interventions in the program code. The data written into a log file would then have to be identified by hand and compared with target values.

However, this is very tedious and susceptible to error.

The object of the invention is to propose a method which offers a very rapid and dedicated analysis of obtained data as well as a data acquisition which is very rapid and thus has the least possible influence on program run in the distributed system.

According to the invention this object is fulfilled through time stamps being generated and stored at previously defined places of the system.

These time stamps can be stored as, for example, a 32 bit number, in which case only low computing power is needed to obtain and store the time stamps. Only small influence on the distributed system occurs. Nevertheless, the obtained values have significance.

According to the invention it is also very advantageous if the time stamps contain the respective time of day, the location, the type, a consecutive number and/or other data.

As a result, each time stamp contains a complete data set in order to be able to produce a relationship to the source of the time stamp and render this capable of evaluation.

A further very advantageous development of the invention is present if the time stamps are generated on a software or hardware basis and can be filed in an intermediate memory.

A smallest possible expenditure of time for generation and filing of the time stamp is thus ensured. Consequently, influencing of the distributed system is as little as possible. Only slight delays are caused. Software-based time stamps can usually be generated within 10 to 100 cycles and filed. On the other hand, hardware-based time stamps can be generated and filed significantly more rapidly, in particular optimally within one cycle.

According to the invention it is extremely advantageous if time stamp generation is filed in the respective hardware as an atomic write operation and is carried out in a register provided for that purpose.

This is the quickest possibility of generating a time stamp and filing for further processing.

A further very advantageous embodiment of the invention is present if time stamp generation is programmed to be machine-intimate and operating system call-ups are avoided, in which case inter-process communication can be provided in order to avoid race conditions.

Thus, a very rapid generation of the time stamps can also be ensured. For example, Mutex or, preferably, Spin-Lock is used in the inter-process communication.

A very advantageous development of the invention is also present if the time stamps are read out and analysed with software support.

Efficient evaluation of the data contained in the time stamps can thus be guaranteed.

In that case, according to the invention it has proved very advantageous if the time stamps of a system are provided graphically and represented two-dimensionally or three-dimensionally.

Possible faulty executions or also other forms of error can be rapidly detected by graphical presentation. A more accurate analysis of the respective fault case is then possible without having to initially execute a plurality of other data packets.

According to a development of the invention it is also extremely advantageous in this connection if logically successive time stamps are linked together, in which case a connection by lines can be executed in a graphical representation.

An even more simple and rapid recording of the important, in particular diverging, items of information is thus possible.

According to the invention it has also proved very advantageous if the lines and/or data points are represented in colour coding, wherein lines and/or data points of a corresponding data size can be represented with the same colour coding.

Associated data points or lines can thus be detected very easily. In addition, data points diverging from a predetermined or settable value or value corridor can be represented in a different colour so as to be able to more easily recognise these differences.

A further very advantageous realisation of the invention is present if the lines and/or data points are represented with colour coding corresponding with the processing time thereof, in which case colours of the rainbow can be used for that purpose so as to represent the distinction between a shorter and a longer processing time.

The running-time behaviour can thus be very effectively analysed. Systematic and sporadic errors can be recognised.

According to a further embodiment of the invention it is also very advantageous if more than two-dimensional or three-dimensional time stamps are projected onto a 2D or 3D system.

As a result, these systems can be optically detected in simple mode and manner. The projection of 3D systems onto 2D systems is also conceivable.

According to the invention it is also extremely advantageous if the values and/or value ranges, which are left out of consideration for the projection, of the omitted dimensions are selectable.

According to the invention it is also very advantageous if the values or value ranges, which are left out of consideration for the projection, of one or more omitted dimensions are represented simultaneously.

Moreover, it has proved to be very advantageous if the values or value ranges, which are left out of consideration for the projection, of one or more omitted dimensions are represented in correspondence with values or value ranges to be selected.

Differentiated analyses of the data contained in the time stamps can be carried out by all these possibilities.

A further, extremely advantageous embodiment of the invention is present when individual items of information of the time stamps are projected.

Figure 2:
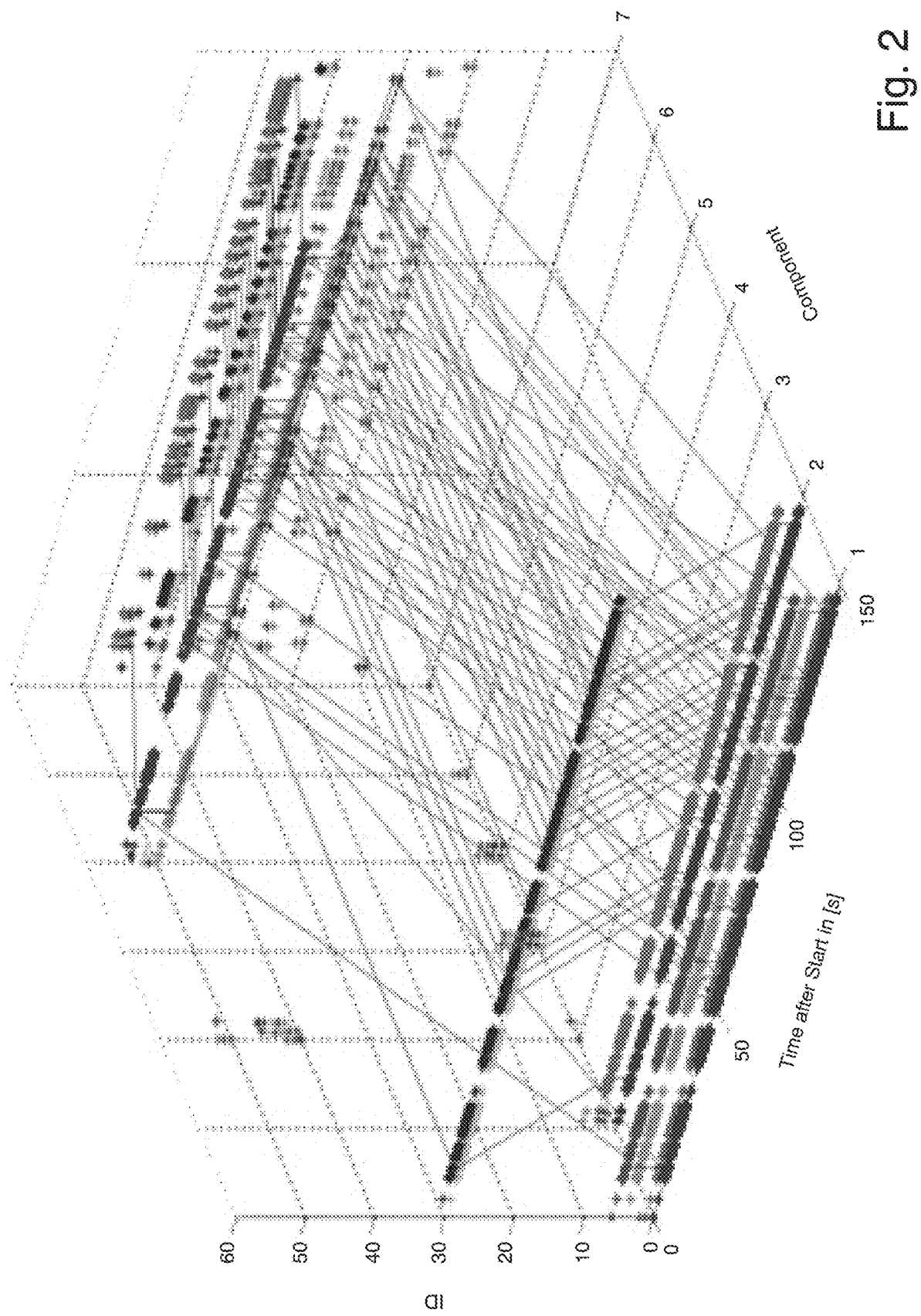
Figure 3:
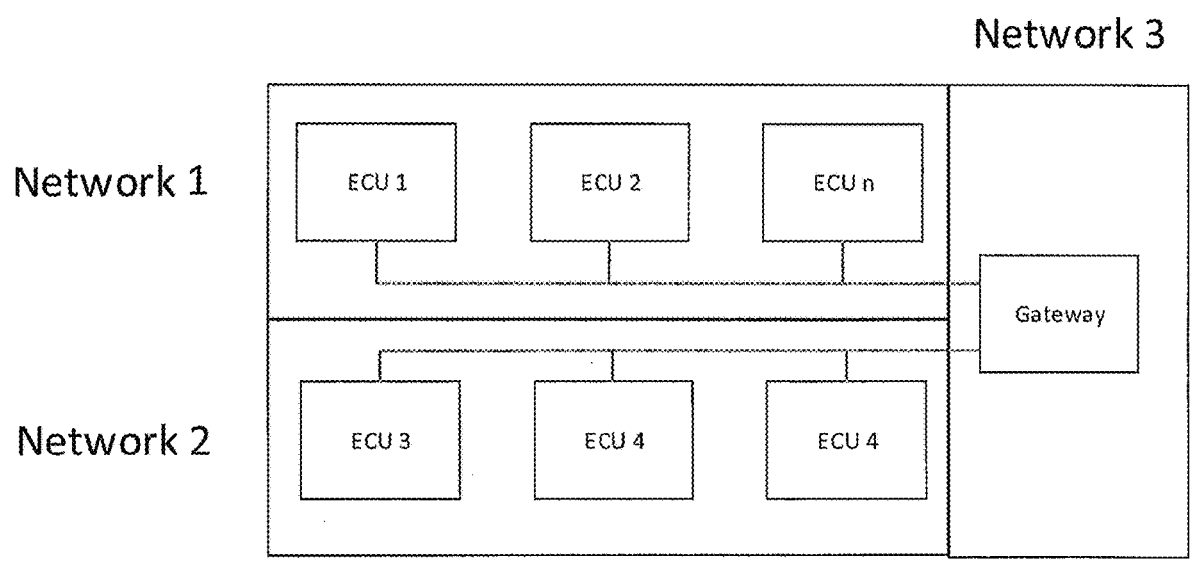
Figure 3:
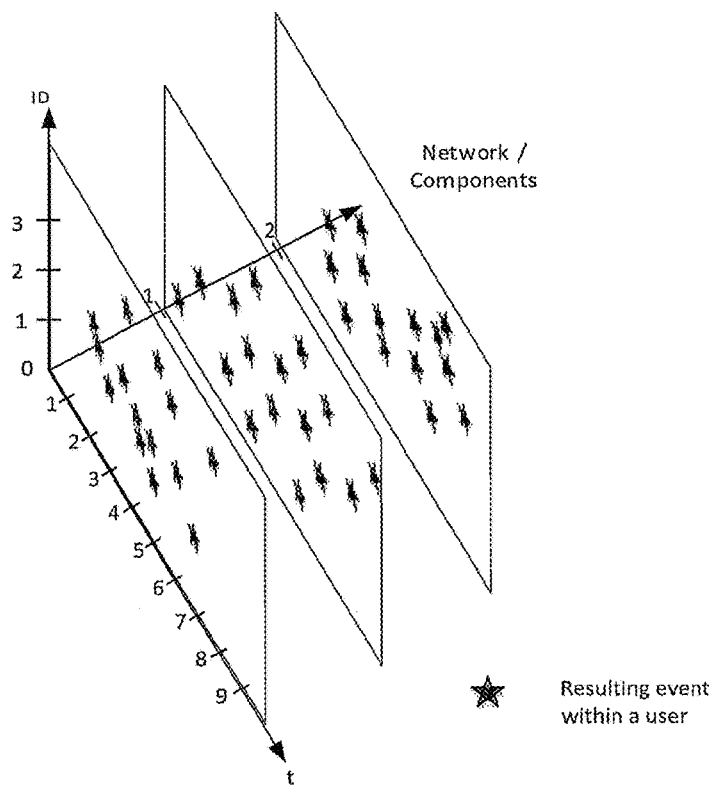
Figure 4:
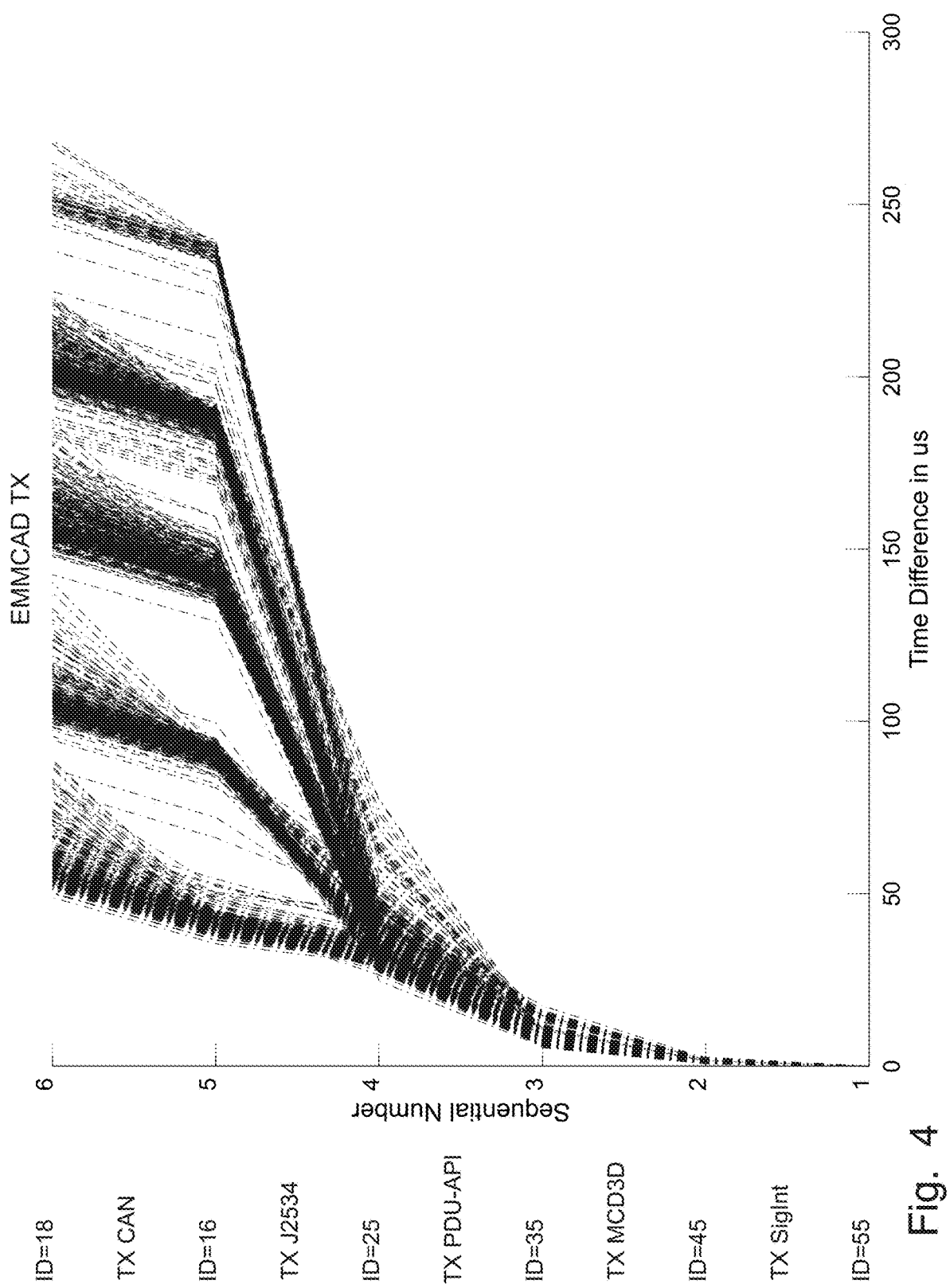

The invention is illustrated in the following by way of an embodiment, wherein:

FIG. 1 shows a schematic illustration of internal program runs and the communication between participants in a distributed network, FIG. 2 shows a typical graphical 3D illustration of the determined data, FIG. 3 shows a schematic illustration of a distributed system, consisting of two sub-networks, which are coupled by way of a gateway, and a parallel projection of the determined events, reduced to three dimensions, and FIG. 4 shows an illustration in which the different processing times are recorded.

The method according to the invention is used for understanding and analysing program progress and interaction of participants in a distributed system.

For that purpose, so-called time stamps, consisting at least of the respective time and an ID, in the program runs are generated. In that case, the ID in turn consists at least of a characterisation for the event or event type and the location.

Further data can be coded in the time stamp. These time stamps are filed in a memory and subsequently read out again and analysed.

The corresponding program routines are programmed in machine-intimate manner, in which case operating system calls are at least largely avoided. This enables least possible influencing of the running time behaviour of the distributed systems.

Ideally, the appropriate program routines are provided in hardware so that there is minimal influencing of the running time behaviour.

In this case, for example, each time stamp is shifted in a register, wherein the time stamp is, for example, a 32 bit number in which all desired items of information are coded.

The distributed systems are usually embedded systems utilised for distributed and usually complex control tasks.

After the time stamps have been generated at intended locations and subsequently read out, these are decoded.

The thus-obtained data sets are then evaluated.

For the evaluation, the relevant data of the respective data sets are graphically represented in a two-dimensional or three-dimensional system.

If more than three items of data per data set are present, then either the data, which is to be represented, of the data sets can be selected or, however, two-dimensional or three-dimensional projections of the data are provided.

Mathematical projection methods with the transformation matrix $(x,y)=A*(d1, d2, \ldots dn)$ have proved satisfactory in that respect.

In that case, values of individual dimensions which are not visible in the projection are set to a fixed value or value range, whereas other dimensions can have any values.

In the case of projection of 6D (dimensions) onto 3D the transformation can read, for example, $(x,y,z)=A*(d1, d3, d4)$.

This means that the dimensions one, three and four are projected in the 3D space.

The dimension d2 can in that case have, for example, any values, whereagainst the dimension d5 can be fixed at the value 7. The dimension d6 can have values between 2 and 4 ($2<=d6<=4$).

This means that only data points which have the value 7 in the dimension d5 and values between 2 and 4 in the dimension d6 are present in the projection.

If the representation is undertaken by way of a computer system, then, for example, the values or value ranges of the individual dimensions per selection box or shift regulator can be interactively selected and set in a GUI.

The graphical output is then newly provided in correspondence with the defaults or the respective selections. Ideally, the graphic is instantaneously adapted to the changed parameters.

Just as the values or value ranges can be adapted and selected, it is conceivable for the respective dimensions to be able to be selected in the same way.

Successive or associated data can be connected together by lines in the representation.

Parallel projections are also conceivable.

It is thus possible in this mode and manner to rapidly and reliably recognise 'freak values', i.e. deviations from the normal run or normal data.

In that case it is also conceivable for freak values outside a predetermined or settable data corridor to be marked in colour.

If such a deviation is identified, then the corresponding data set or corresponding data sets can be taken into closer consideration and the deviation localised.

Laborious manual analyses and comparisons by means of inspection of log files can be eliminated.

In addition, there is the possibility of colouring measurement points and connecting lines in correspondence with processing time. In that case it is conceivable to use the colours of the rainbow for that purpose. Thus, the processing time of specific items of information, data packets, routines, etc., represented in the respective projection, can be visualized in simple mode and manner.

In that case it is readily recognisable whether lengthy or short processing took place and how these processing times are distributed. With the help of statistical considerations it is then possible to draw conclusions with respect to causes.

Moreover, it can thus be recognised whether and how the processing times in different planes are correlated with one another.

The invention claimed is:

1. A method comprising steps of:
providing a distributed system comprising programmable control systems and/or data-processing systems,
generating time stamps directly via hardware of the control systems and/or of the data-processing systems of the distributed system, wherein the time stamps contain a respective clock time, a location, an occurrence type, a consecutive number and/or other data,
filing the time stamps in an intermediate memory,
storing the time stamps at previously defined places of the distributed system,
reading out the time stamps,
analyzing the time stamps with software support,
graphically providing the time stamps of the system, and representing the time stamps two-dimensionally or three-dimensionally with the respective time being after a start time,
projecting more than two-dimensional or three-dimensional time stamps on a 2D or 3D system,
filing the time stamp generation in hardware as an atomic write operation, and
executing the time stamp generation in a register provided for that purpose
wherein the generating and the storing causes tracking of program progress, flow of information, and/or interaction of users in the distributed system, and
wherein all information is shown only by diagrams.

2. The method according to claim 1, further comprising steps of:
programming the time stamp generation to be machine-intimate, and
avoiding operating system calls.

3. The method according to claim 2, the method further comprising a step of:

providing inter-process communication in order to avoid race conditions.

4. The method according to claim 1, the method further comprising a step of:

linking logically successive time stamps with one another.

5. The method according to claim 4, the method further comprising a step of:

providing a connection by lines as a graphic representation.

6. The method according to claim 5, wherein the lines and/or data points are represented with color coding.

7. The method according to claim 6, wherein lines and/or data points of a corresponding data size are represented coded in the same color.

8. The method according to claim 5, wherein the lines and/or data points are represented with color coding corresponding to the processing time thereof.

9. The method according to claim 8, further comprising a step of:

using colors of a rainbow to represent a distinction between a shorter processing time and a longer processing time.

10. The method according to claim 1, the method further comprising steps of:

selecting values and/or value ranges of omitted dimensions, and leaving out the omitted dimensions from the projection.

11. The method according to claim 1, further comprising steps of:

leaving out values or value ranges from the projection, and simultaneously representing the values or value ranges.

12. The method according to claim 1, further comprising steps of:

leaving out from the projection values or value ranges of one or more omitted dimensions, and representing the values or the value ranges in accordance with values or value ranges to be selected.

13. The method according to claim 1, wherein the method further comprises a step of:

projecting individual items of information of the time stamps.

14. The method according to claim 1, wherein the method further comprises a step of:

filing the time stamps in an intermediate memory.

15. The method according to claim 1, wherein the time stamps are represented three-dimensionally with the respective time being after a start time.

* * * * *